US008707571B2

(12) United States Patent
Shin et al.

(10) Patent No.: US 8,707,571 B2
(45) Date of Patent: Apr. 29, 2014

(54) APPARATUS FOR MEASURING DIMENSIONS OF SPACER GRID FOR NUCLEAR FUEL ASSEMBLIES

(75) Inventors: Jung Cheol Shin, Daejeon (KR); Yong Gu Han, Daejeon (KR); Eun Hye Kim, Daejeon (KR); Jung Yoon Han, Daejeon (KR)

(73) Assignee: Kepco Nuclear Co., Ltd., Daejeon (KR)

( * ) Notice: Subject to any disclaimer, the term of this patent is extended or adjusted under 35 U.S.C. 154(b) by 404 days.

(21) Appl. No.: 13/335,117

(22) Filed: Dec. 22, 2011

(65) Prior Publication Data

US 2013/0008040 A1 Jan. 10, 2013

(30) Foreign Application Priority Data

Jul. 8, 2011 (KR) .................. 10-2011-0067724

(51) Int. Cl.
G21C 17/06 (2006.01)
G21C 17/00 (2006.01)

(52) U.S. Cl.
USPC ............................................................ 33/502

(58) Field of Classification Search
CPC ...................................................... B41J 11/68
USPC ........ 400/621.1; 83/14–16, 18; 376/245, 249; 33/502, 1 BB, 655, 545, 546, 549, 551, 33/553, 554, 783, 784, 792, 793, 803, 805, 33/533

See application file for complete search history.

(56) References Cited

U.S. PATENT DOCUMENTS

| 1,571,641 | A | * | 2/1926 | Pratt | 33/805 |
| 3,894,327 | A | * | 7/1975 | Jabsen | 29/723 |
| 4,048,009 | A | * | 9/1977 | Weilbacher | 376/245 |
| 4,274,205 | A | * | 6/1981 | Starr et al. | 33/502 |
| 4,766,374 | A | * | 8/1988 | Glass et al. | 324/207.24 |
| 4,974,333 | A | * | 12/1990 | Ginzburg | 33/783 |
| 5,465,496 | A | * | 11/1995 | Axon | 33/522 |
| 5,909,013 | A | * | 6/1999 | Dlugos | 177/25.11 |
| 6,327,788 | B1 | * | 12/2001 | Seddon et al. | 33/551 |
| 6,549,600 | B1 | * | 4/2003 | Beier et al. | 376/258 |
| 7,347,002 | B2 | * | 3/2008 | Foege | 33/783 |
| 2001/0019596 | A1 | * | 9/2001 | Arias et al. | 376/245 |
| 2004/0040168 | A1 | * | 3/2004 | Nagatsuka et al. | 33/549 |

FOREIGN PATENT DOCUMENTS

| KR | 10-2001-0029780 A | 4/2001 |
| KR | 10-0784008 B1 | 12/2007 |

OTHER PUBLICATIONS

English Language Abstract of KR 10-2006-0107405 A which is an application publication of KR 10-0784008 B1.
English Language Abstract of KR 10-2001-0029780 A.

* cited by examiner

Primary Examiner — Christopher Fulton
(74) Attorney, Agent, or Firm — Rabin & Berdo, P.C.

(57) ABSTRACT

Provided is an apparatus for measuring dimensions of a spacer grid for nuclear fuel assemblies. The apparatus includes a fixing unit fixed to a measuring table placed on a floor and kept insulated from vibrations caused by external force, a measuring unit mounted on the fixing unit and configured so that measuring members are installed on both sides of a rectangular spacer grid and move in forward and backward directions by cylinders while grasping the both sides of the spacer grid, and measure abnormalities in the both sides of the spacer grid, and a displacement measuring unit mounted on one side of the measuring unit and sending the measured abnormalities in the both sides of the spacer grid to the outside.

10 Claims, 7 Drawing Sheets

APPARATUS FOR MEASURING DIMENSIONS OF SPACER GRID FOR NUCLEAR FUEL ASSEMBLIES

CROSS-REFERENCE TO RELATED APPLICATIONS

The present application claims priority under 35 U.S.C. 119 to Korean Patent Application No. 10-2011-0067724, filed on Jul. 8, 2011, the disclosure of which is expressly incorporated by reference herein in its entirety.

BACKGROUND OF THE INVENTION

1. Field of the Invention

The present invention relates, in general, to an apparatus for measuring dimensions of a spacer grid for nuclear fuel assemblies and, more particularly, to an apparatus for measuring dimensions of a spacer grid for nuclear fuel assemblies, capable of measuring all the sides of the spacer grid that support the nuclear fuel assemblies to accurately detect abnormalities in the spacer grid, preventing the spacer grids from interfering with each other, and preventing malfunctions from occurring in the real situation of a nuclear reactor in advance to provide reliability.

2. Description of the Related Art

Atomic power generation based on a light water reactor is designed to generate energy via the fission of nuclear fuel and use the energy to heat primary cooling water, transmit the energy of the heated primary cooling water to secondary cooling water in a steam generator to generate steam, convert the generated steam into rotational energy with a steam turbine, and produce electricity with a generator.

In general, apparatuses that measure spacer grids for the light water reactor measure all the sides of a spacer grid for a plurality of nuclear fuel assemblies stored at a fuel storage place.

All the sides of the spacer grid are measured using such a spacer grid measuring apparatus, thereby detecting abnormalities in the sides of the spacer grid.

Examples of the related art include Korean Patent No. 10-0784008, entitled "NUCLEAR FUEL ASSEMBLY LOW PRESSURE DROP TOP NOZZLE" and Korean Patent Application Publication No. 10-2001-0029780, entitled "FUEL ASSEMBLY MECHANICAL FLOW RESTRICTION APPARATUS FOR DETECTING FAILURE IN SITU OF NUCLEAR FUEL RODS IN A FUEL ASSEMBLY DURING REACTOR SHUTDOWN."

As shown in FIG. 1, an apparatus for measuring a spacer grid of the related art includes a fixing unit 10 fixed to a measuring table 30 placed on a floor and kept safe from vibrations caused by external force.

A pair of measuring units 20 is mounted on the fixing unit 10. The pair of measuring units 20 is capable of grasping both sides of a rectangular spacer grid 40 disposed therein and moving in forward and backward directions, thereby measuring the both sides of the spacer grid 40.

However, the measuring units are too short to measure the whole length of the sides of the spacer grid, so that there can be unmeasured portions.

Thus, abnormalities in the unmeasured portions of the spacer grid cause abnormal effects in the supported nuclear fuel assemblies when operated.

SUMMARY OF THE INVENTION

Accordingly, the present invention has been made keeping in mind the above problems of the related art, and an objective of the present invention is to provide an apparatus for measuring dimensions of a spacer grid for nuclear fuel assemblies, capable of measuring all the sides of the spacer grid for the nuclear fuel assemblies to accurately detect abnormalities in the measured spacer grid, avoiding reducing the life span of the nuclear fuel assemblies, and preventing malfunctions from occurring in the real operation of a nuclear reactor to provide reliability.

In order to achieve the above described objective, according to one aspect of the present invention, there is provided an apparatus for measuring the dimensions of a spacer grid for nuclear fuel assemblies stored at a fuel storage place for use in a light water reactor. The apparatus comprises: a fixing unit fixed to a measuring table placed on a floor and kept safe from vibrations caused by external force; a measuring unit mounted on the fixing unit and configured so that measuring members are installed in both sides of a rectangular spacer grid in a tong-like shape so as to grasp the sides of the spacer grid, in which a plurality of nuclear fuel assemblies are retained, move in forward and backward directions by cylinders, and measure abnormalities of the sides of the spacer grid; and a displacement measuring unit mounted on one side of the measuring unit and sending the measured abnormalities of the sides of the spacer grid to the outside.

Here, the fixing unit can include: a main fixing member that has a "C" shape and includes through-holes of a predetermined diameter in upper and lower plates thereof; a base member that has a rectangular shape and includes middle protrusion pieces horizontally mounted on and fastened to the main fixing member and finish pieces formed at both ends thereof; and an auxiliary fixing member that includes a connection piece configured to be interposed between the pair of upper and lower protrusion pieces that are formed in the middle of the base member, and support pieces formed on both sides of the connection piece in mirror symmetry.

Further, the measuring unit can include: a pair of movable members, each of which is horizontally coupled to first rails via a short shaft piece between the auxiliary fixing member coupled to the protrusion pieces of the base member and the finish pieces so as to move along the first rails in left and right directions and includes a long shaft piece extending perpendicular to the short shaft piece; and measuring members, each of which is formed in parallel to the long shaft piece of each movable member, moves along a second rail, one end of which is integrally fixed to the short shaft piece, in forward and backward directions, and measures one of the both sides of the grasped spacer grid.

Further, the auxiliary fixing member can be assembled in such a manner that a fixing pin is fitted into a series of holes aligned when the connection piece thereof is interposed between the protrusion pieces of the base member and when the protrusion pieces of the base member connection piece are interposed between the upper and lower plates of the main fixing member.

Each measuring member can include: an L-shaped connection piece that is fitted around the second rail formed in parallel to the long shaft piece at a lower portion thereof and that moves in the forward and backward directions; a transfer piece that is integrally fixed to a top surface of the lower portion of the connection piece, that is coupled with a transfer pipe, that is partially inserted into a guide channel of the long shaft piece, and that is fitted around the transfer pipe spaced apart from the second rail by a predetermined distance so as to move in the forward and backward directions; and a grip piece that has a contact piece protruding in the middle of one side of the connection piece, the other side of which is in contact with the transfer piece, and that grasps one of the both sides of the spacer grid.

Further, the displacement measuring unit can be inserted into and fixed in a mounting piece mounted on one side of the short shaft piece with the base member interposed between the mounting piece and the short shaft piece.

In addition, the displacement measuring unit can send measurement information, for example, a variation of length caused by the abnormalities in the sides of the spacer grid which was measured by the movement of the grip pieces, to the outside.

Also, the measuring unit can measure the whole length of the sides of the spacer grid when the movable members move along the first rails in the left and right directions and when the measuring members move along the second rails in the forward and backward directions.

The grip piece can be formed of synthetic resin so that an outer surface of the spacer grid is not damaged or scratched.

Further, the first cylinder can supply air or oil pressure to the transfer pipe so that the measuring member moves toward the short shaft piece, and the second can supply air or oil pressure to the transfer pipe so that the measuring member moves away from the short shaft piece.

According to the present invention as described above, the whole length of the sides of the spacer grid for the nuclear fuel assemblies can be measured by adjusting the distance moved, so that any abnormality in the measured spacer grid can be accurately detected.

Further, it is possible to prevent the life span of the nuclear fuel assembly from being reduced, and to prevent malfunctions from occurring in the real situation of a nuclear reactor in advance to provide excellent reliability.

BRIEF DESCRIPTION OF THE DRAWINGS

The objectives, features and other advantages of the present invention will be more clearly understood from the following detailed description when taken in conjunction with the accompanying drawings, in which.

DETAILED DESCRIPTION OF THE INVENTION

Reference will now be made in greater detail to an exemplary embodiment of the invention with reference to the accompanying drawings.

The structure of an apparatus for measuring dimensions of a spacer grid of a nuclear fuel assembly according to an exemplary embodiment of the present invention will be described below with reference to FIGS. 2 to 6B.

Figure 1:
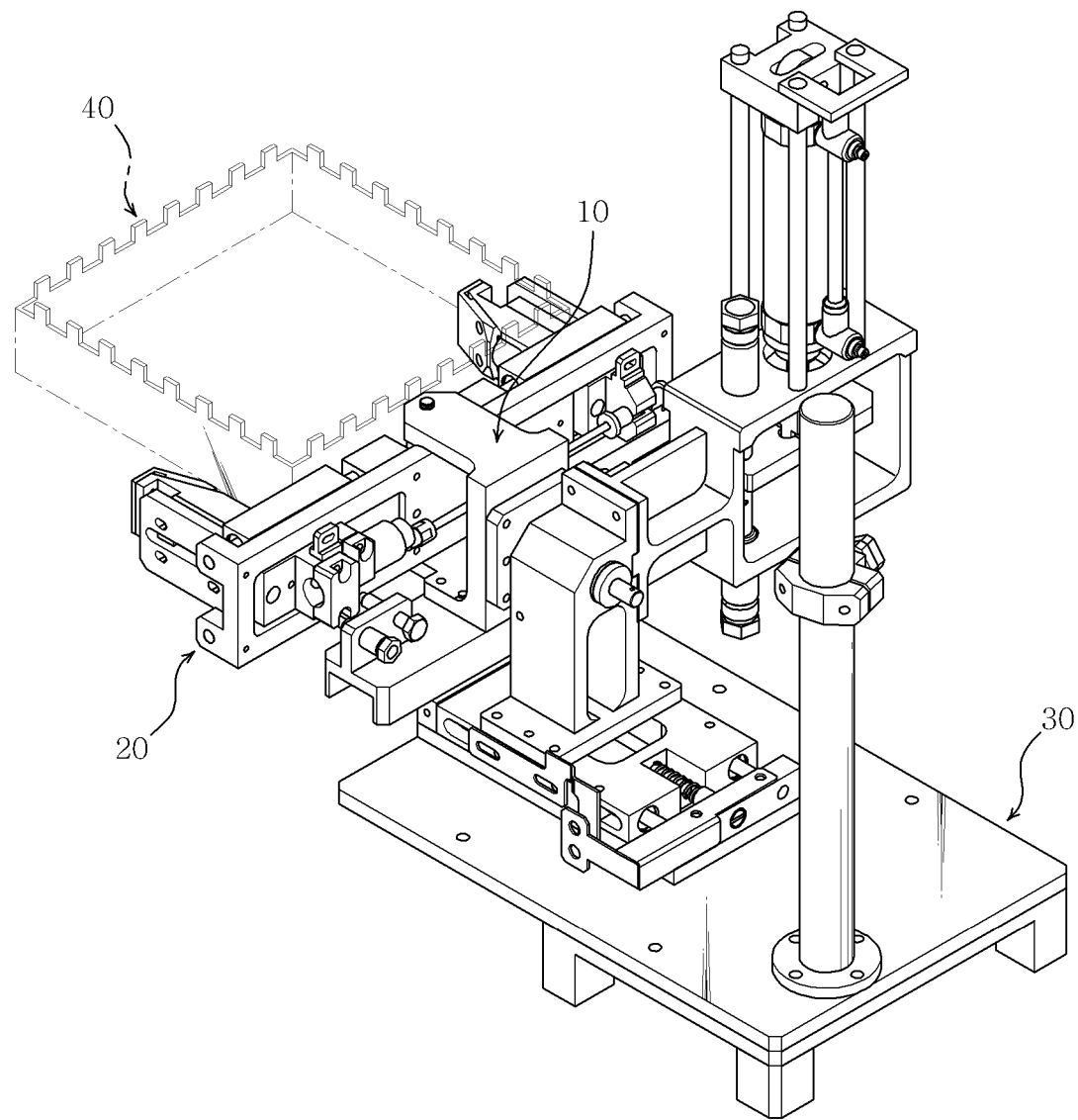
FIG. 1 is a perspective view showing a conventional apparatus for measuring dimensions of a spacer grid of a nuclear fuel assembly.
Figure 2:
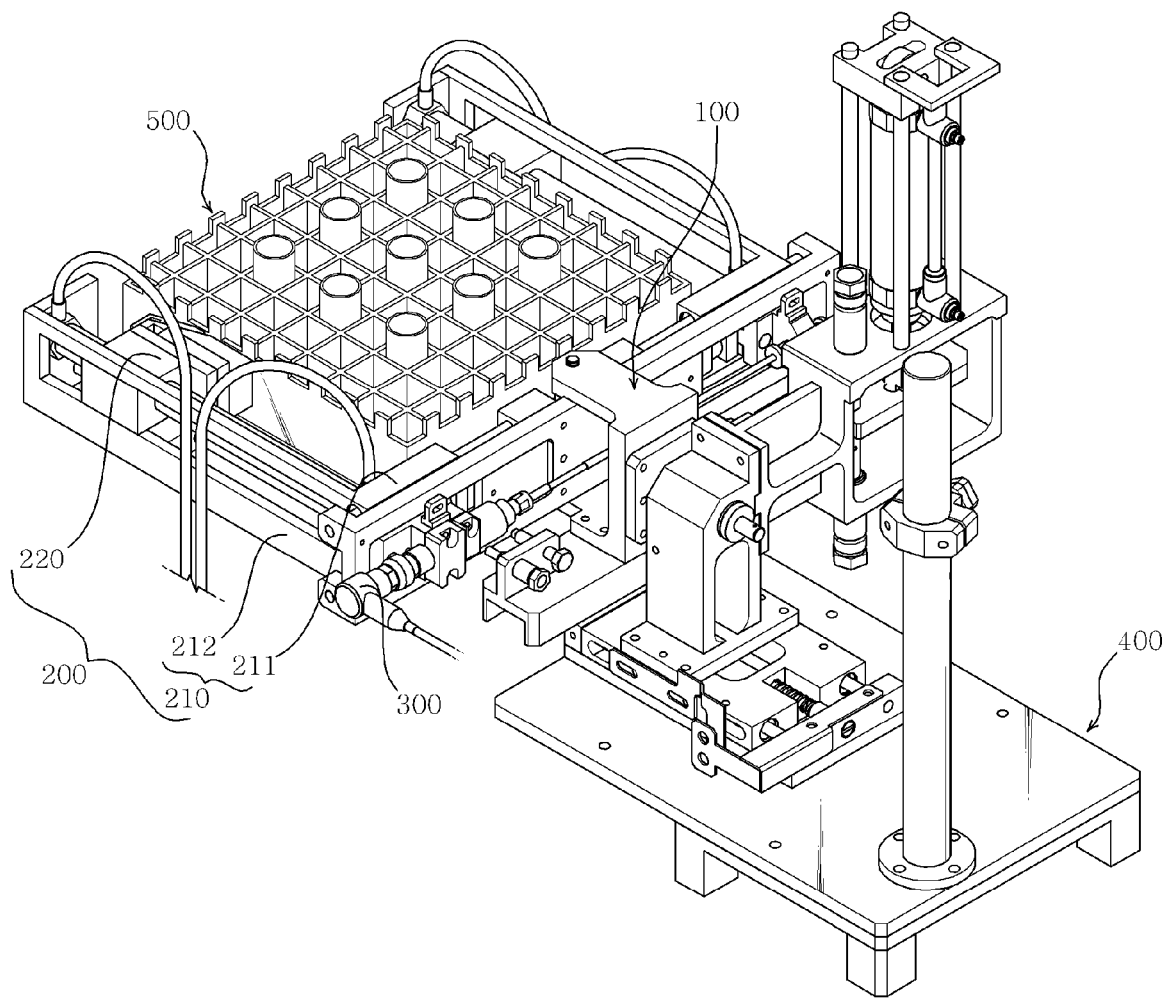
FIG. 2 is a perspective view showing an apparatus for measuring dimensions of a spacer grid of a nuclear fuel assembly according to an exemplary embodiment of the present invention.
Figure 3:
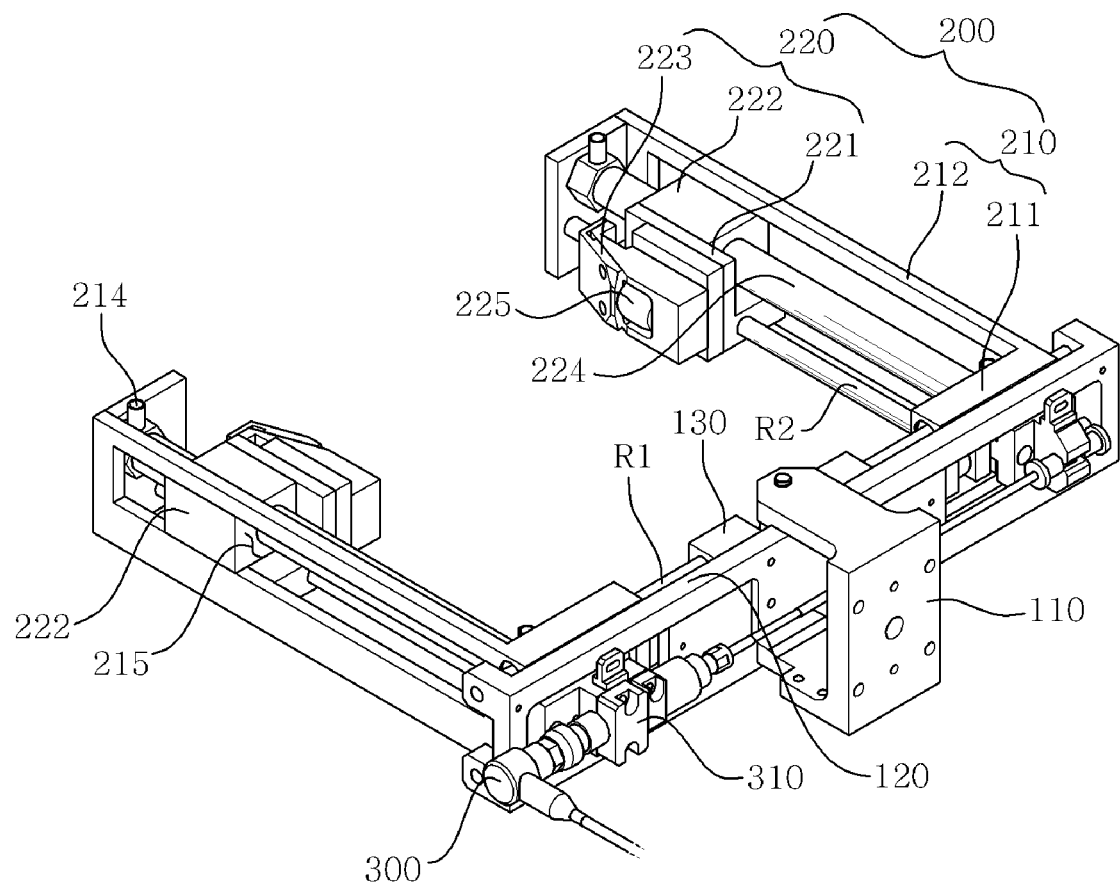
FIG. 3 is a perspective view showing a fixing unit, a measuring unit, and a displacement measuring unit that are assembled in accordance with the exemplary embodiment of the present invention.
Figure 4:
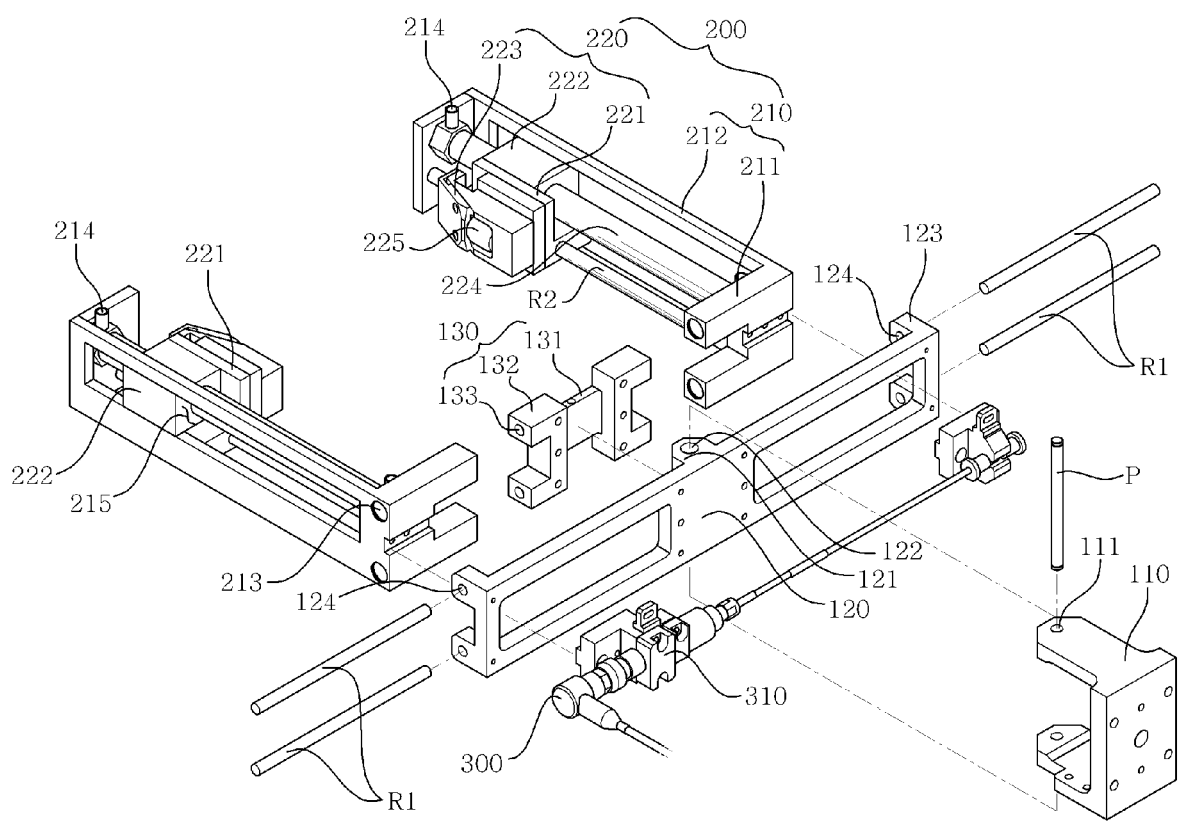
FIG. 4 is a perspective view showing the fixing unit, the measuring unit, and the displacement measuring unit when they are disassembled in accordance with the exemplary embodiment of the present invention.
Figure 5:
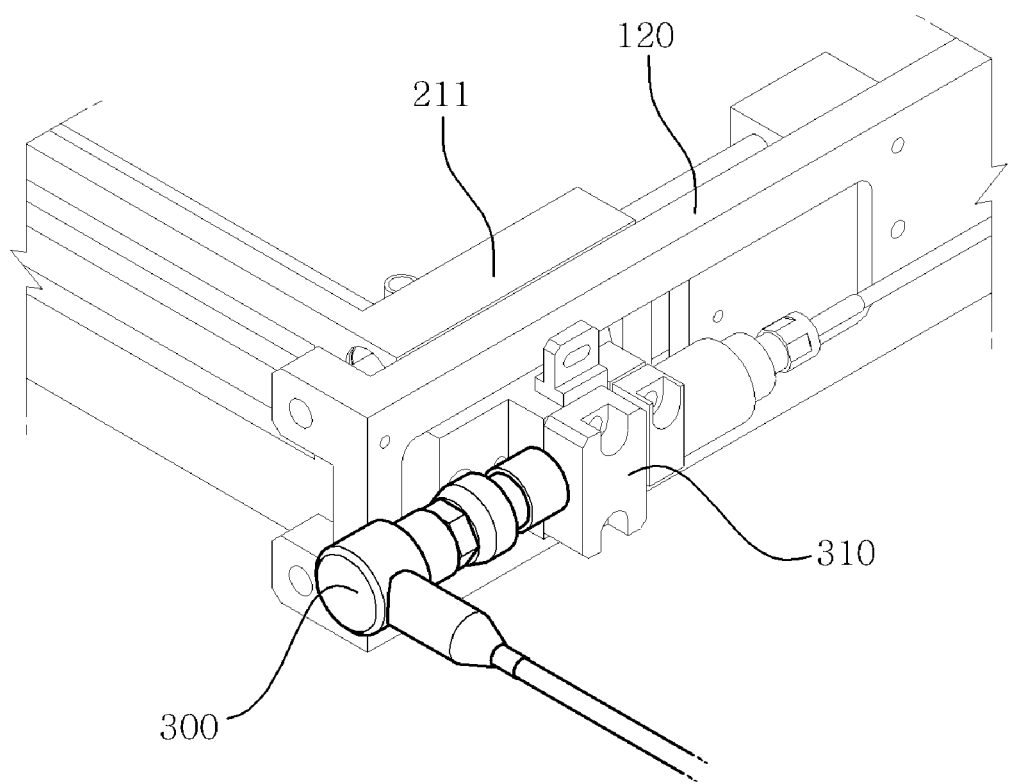
FIG. 5 is a perspective view showing the displacement measuring unit mounted on the measuring unit in accordance with the exemplary embodiment of the present invention.
Figure 6A:
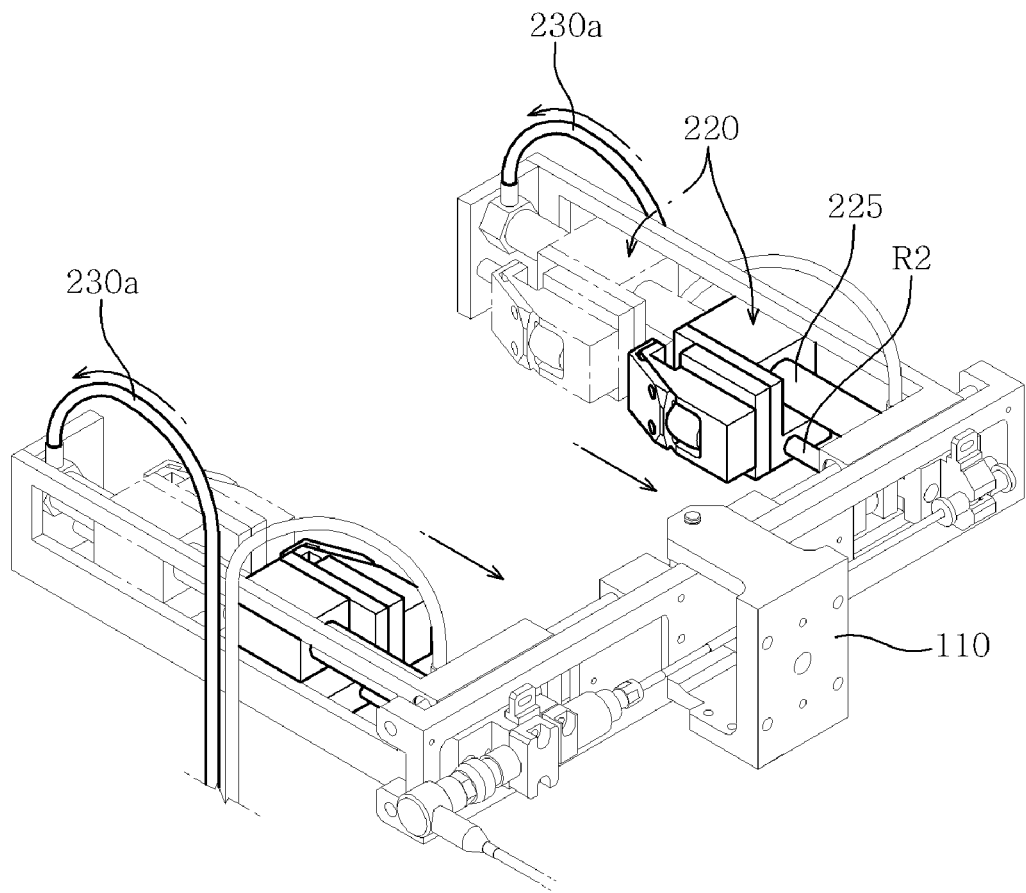
FIGS. 6A and 6B are perspective views showing a measuring member moving in forward and backward directions in accordance with the exemplary embodiment of the present invention.
Figure 6B:
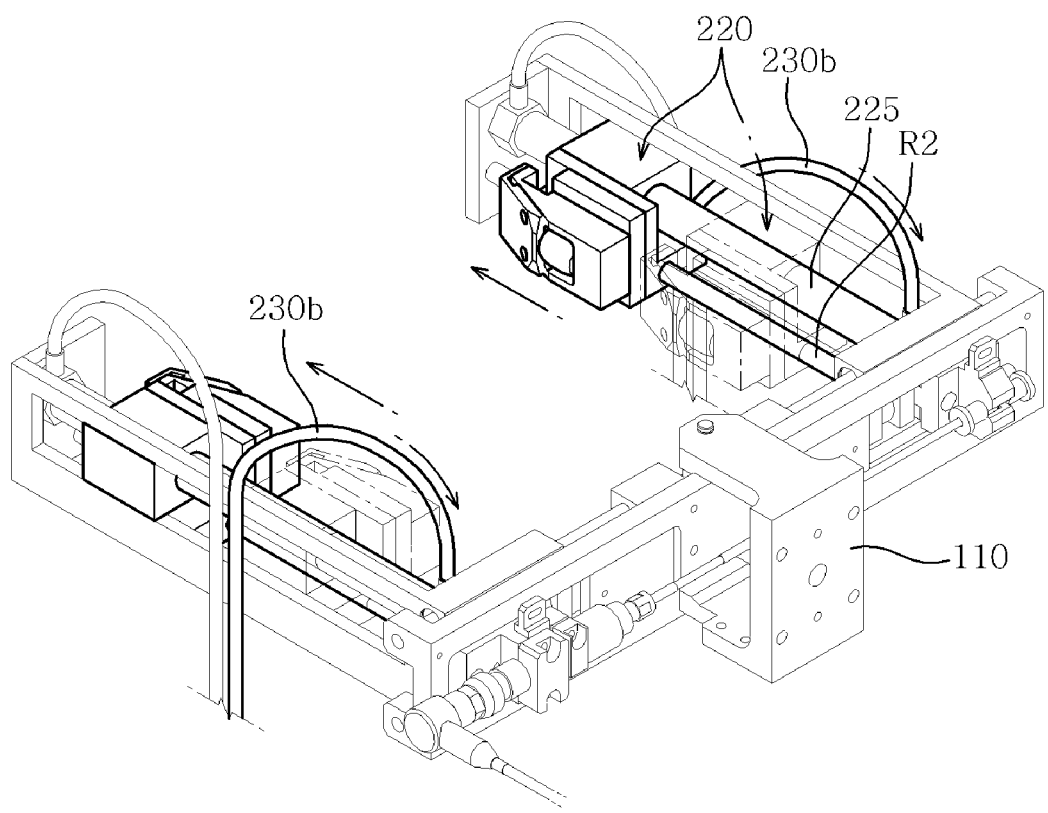

FIG. 2 is a perspective view showing an apparatus for measuring dimensions of a spacer grid of a nuclear fuel assembly according to an exemplary embodiment of the present invention. FIG. 3 is a perspective view showing a fixing unit, a measuring unit, and a displacement measuring unit that are assembled in accordance with the exemplary embodiment of the present invention, whereas FIG. 4 is a perspective view showing the fixing unit, the measuring unit, and the displacement measuring unit that are disassembled in accordance with the exemplary embodiment of the present invention. FIG. 5 is a perspective view showing the displacement measuring unit mounted on the measuring unit in accordance with the exemplary embodiment of the present invention. FIGS. 6A and 6B are perspective views showing a measuring member moving in forward and backward directions in accordance with the exemplary embodiment of the present invention.

As shown in FIGS. 2 to 4, the apparatus for measuring dimensions of a spacer grid of a nuclear fuel assembly according to an exemplary embodiment of the present invention includes a fixing unit 100, a measuring unit 200, and a displacement measuring unit 300.

The fixing unit 100 is fixed to a measuring table 400, and is kept in a secured state by the measuring table from vibrations caused by external force.

The measuring table 400 is mounted on a XYZ test table (not shown) which is driven by a plurality of cylinders.

The fixing unit 100 includes a main fixing member 110, a base member 120, and an auxiliary fixing member 130.

The main fixing member 110 has a "C" shape, and includes through-holes 111 of a predetermined diameter which pass through upper and lower plates thereof.

The base member 120 has a rectangular shape and is mounted on and fixed to the main fixing member 110. Also, the base member 120 includes middle protrusion pieces 121 to fasten the base member 120 to the main fixing member 110 and finish pieces 123 formed at both ends thereof.

The base member 120 is designed so that fastening holes 122 of the middle protrusion pieces 121 are aligned with the through-holes 111 of the main fixing member 110 and thereto a fixing pin P is inserted to couple the main fixing member 110 and the base member 120.

The protrusion pieces 121 having a polygonal shape are formed on the inner surface of the base member 120, and are spaced apart from each other by a predetermined distance The finish pieces 123 of the base member 120 are each provided with an insertion hole 124 having a predetermined diameter. Two pairs of first rails R1, each of which has a predetermined length, are inserted into the insertion holes 124, respectively.

The first rails R1 pass through the insertion holes 124 of the finish pieces 123, and then are mounted into the auxiliary fixing member 130 interposed between the protrusion pieces 121 of the base member 120.

The auxiliary fixing member 130 includes a connection piece 131 configured to be interposed between the pair of upper and lower protrusion pieces 121 that are formed in the middle of the base member 120, and support pieces 132 formed on both sides of the connection piece 131 in a mirror symmetry.

The support pieces 132 of the auxiliary fixing member 130, which are symmetrical between the left and right sides, are each provided with a pair of mounting holes 133 so that the first rails R1 can be mounted.

The auxiliary fixing member 130 is assembled in such a manner that the fixing pin P is forcibly fitted into a series of holes, including the through-holes 111 and the fastening holes 122, aligned when the protrusion pieces 121 of the base member 120, between which the connection piece 131 is interposed, are interposed between the upper and lower plates of the main fixing member 110, so that the auxiliary fixing member 130 can be kept securely in an assembled state from external shocks and vibrations.

In the embodiment, the main fixing member 110, the base member 120, and the auxiliary fixing member 130 are coupled by the fixing pin P. This configuration, however, is merely one example for achieving the objective of the present invention, and thus the present invention is not limited to this configuration. It is apparent to those skilled in the art that the present invention can provide the same effect even in the case of using screws, rivets, bolts, and so forth.

The measuring unit 200 is movably fitted around the first rails R1 mounted between the auxiliary fixing member 130 and the finish pieces 123 of the base member 120.

The measuring unit 200 is configured so that measuring members 220 are installed in both sides of a rectangular spacer grid 500 in a tong-like shape so as to grasp the both sides of the spacer grid 500, in which a plurality of nuclear fuel assemblies are held, and move in forward and backward directions by cylinders 230a and 230b, and measure abnormalities in the sides of the spacer grid 500.

The measuring unit 200 includes a pair of movable members 210 and a pair of measuring members 220.

Each movable member 210 is configured so that a short shaft piece 211 thereof is horizontally coupled to the first rails R1 between the auxiliary fixing member 130 coupled to the protrusion pieces 121 of the base member 120 and the finish pieces 123 of the base member 120 so as to move along the first rails R1 in left and right directions, and includes a long shaft piece 212 extending from the short shaft piece 211 perpendicular to the short shaft piece 211.

The short shaft piece 211 includes transfer holes 213 into which the first rails R1 mounted between the finish piece 123 of the base member 120 and the auxiliary fixing member 130, are fitted respectively, and thereby the short shaft piece 211 moves in the left and right directions along the first rails R1.

The short shaft piece 211 can be freely moved in the left and right directions by a unit (not shown) mounted on a lower portion thereof, and come into close contact with the spacer grid 500.

The measuring members 220 move in the forward and backward directions on second rails R2, each of which is installed in parallel on the long shaft piece 212 of each movable member 210 and is integrally fixed to the short shaft piece 211 at one end thereof. Thereby, the both sides of the spacer grid 500 are measured.

Each measuring member 220 includes a connection piece 221, a transfer piece 222, and a grip piece 223.

The connection piece 221 is formed in an L shape of which a lower portion is fitted around the second rail R2 that is installed in parallel to the long shaft piece 212 so as to move in the forward and backward directions.

The transfer piece 222 is integrally fixed to a top surface of the lower portion of the connection piece 221, is coupled with a transfer pipe 224, and is partially inserted into a guide channel 215 of the long shaft piece 212. The transfer piece 222 is fitted around the transfer pipe 224 spaced apart from the second rail R2 in a predetermined distance so as to move in the forward and backward directions.

The measuring unit 200 measures the both sides of the spacer grid 500 when the movable members 210 move along the first rails R1 in the left and right directions and when the measuring members 220 move along the second rails R2 in the forward and backward directions.

A contact piece 225 protrudes in the middle of one side of the connection piece 221, the other side of which is in contact with the transfer piece 222, thereby causing the grip piece 223 to grasp one of the both sides of the spacer grid 500.

The contact piece 225 protrudes toward the spacer grid 500 in a streamlined shape, and comes into close contact with the grasped spacer grid 500.

The grip piece 223 is formed of synthetic resin so that an outer surface of the spacer grid 500 is not damaged or scratched.

In this embodiment, the material of the grip piece 222 is synthetic resin, but the present invention is not limited to this material.

The displacement measuring unit 300 is mounted on one side of the measuring units 200, and sends the measured abnormalities in the both sides of the spacer grid 500 to the outside.

The displacement measuring unit 300 is inserted into and fixed to a mounting piece 310 mounted on one side of the short shaft piece 211 with the base member 120 interposed between the short shaft piece 211 and the mounting piece 310.

The displacement measuring unit 300 sends measurement information to the outside. The measurement information includes a variation in length caused by abnormalities in the sides of the spacer grid 500, which is measured by the movement of the grip pieces 223.

The displacement measuring unit 300 employs an electrical transformer such as a linear variable differential transformer (LVDT) that measures a difference in linear distance. For example, three solenoid coils are located around a tube, among which one is located between the others and is a primary coil.

Thus, a magnetic core moves along the center of the tube, and informs about the position of a measurement target.

As shown in FIG. 5, the mounting piece 310 in which the displacement measuring unit 300 is inserted and fixed, is inserted into a rectangular slot formed in the base member 120.

The displacement measuring unit 300 is mounted on one side of the short shaft piece 211 of the movable member 210 that is in close contact with an inner side of the base member, and moves in the left and right directions to come into close contact with the both sides of the spacer grid 500.

The displacement measuring unit 300 sends the measurement information about the abnormalities in the sides of the spacer grid 500 to the outside using a cable.

As shown in FIGS. 6A and 6B, the measuring member 220 freely moves in the forward and backward directions using a pair of cylinders 230a and 230b connected to nozzles 214 provided on both ends of the transfer pipe 224.

The pair of cylinders 230a and 230b is configured so that the first cylinder 230a is connected to one end of the transfer pipe 224 and the second cylinder 230b is connected to the other end of the transfer pipe 224.

When the first cylinder 230a supplies the transfer pipe 224 with air or oil pressure, the measuring member 220 moves toward the short shaft piece 211. In contrast, when the second cylinder 230b supplies the transfer pipe 224 with air or oil pressure, the measuring member 220 moves away from the short shaft piece 211.

Use and operation of the apparatus for measuring dimensions of a spacer grid of a nuclear fuel assembly having the aforementioned configuration according to the exemplary embodiment of the present invention will be described below.

First, as shown in FIGS. 2 to 4, the apparatus for measuring dimensions of a spacer grid of a nuclear fuel assembly is previously assembled and modularized at a workshop.

The measuring unit 200 has enough size to measure various spacer grids 500 for a plurality of nuclear fuel assemblies.

As shown in FIG. 5, the displacement measuring unit 300 is inserted into and fixed in the mounting piece 310 mounted on one side of the short shaft piece 211 that is a component of the measuring unit 200.

The displacement measuring unit 300 sends measurement information about the abnormalities in the spacer grid 500 which is measured by the measuring unit 200 to the outside.

As shown FIGS. 6A and 6B, the movable member 210 moves in the left and right directions using a separate unit mounted on a lower portion of the short shaft piece 211, and comes into close contact with the spacer grid 500.

Then, the first cylinder 230a connected to one end of the transfer pipe 224 supplies air or oil pressure, and thus the measuring member 220 moves forward to minutely measure the both sides of the closely contacted spacer grid 500, so that it is possible to detect the abnormalities in the both sides of the spacer grid 500.

In contrast, the second cylinder 230b connected to the other end of the transfer pipe 224 supplies air or oil pressure, and thus the measuring member 220 moves forward to measure in minute detail the both sides of the spacer grid 500, so that it is possible to detect the abnormalities in the both sides of the spacer grid 500.

Further, when any overlooked or suspicious point is found in the process of measuring the spacer grid 500, the movement of the measuring member 220 is adjusted using the first and second cylinders 230a and 230b, so that it is possible to more accurately detect the abnormalities in the both sides of the spacer grid 500.

When the other unmeasured sides of the spacer grid 500 are measured by the measuring member 220, the spacer grid 500 is rotated and then is measured in the aforementioned sequence.

Thus, the measuring unit 200 freely moves in the left and right directions and in the forward and backward directions to measure all the sides of the spacer grid 500, so that it is possible to accurately detect the abnormalities in the both sides of the spacer grid 500, and to store and use the nuclear fuel assembly for a long time.

Although the exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for measuring dimensions of a spacer grid for a nuclear fuel assembly, the apparatus comprising:
    a fixing unit fixed to a measuring table;
    a measuring unit mounted on the fixing unit and including
        at least one movable member coupled to the fixing unit and being able to move in a first horizontal direction on the fixing unit, and
        at least one measuring member configured to measure dimensions of the spacer grid, coupled to a corresponding one of the at least one movable member and being able to move in a second horizontal direction on the movable member; and
    a displacement measuring unit coupled to one side of the measuring unit.

2. The apparatus as set forth in claim 1, wherein the fixing unit includes:
    a main fixing member having an upper plate and a lower plate at both ends;
    a base member fixed to the main fixing member, the base member comprising,
        middle protrusion pieces formed in the middle of the base member and configured to be fastened to the main fixing member,
        finish pieces formed at both ends of the base member, and
        at least one first rail configured to be inserted into the middle protrusion pieces and the finish pieces; and
    an auxiliary fixing member comprising,
        a connection piece configured to be interposed between the protrusion pieces, and
        support pieces formed at both sides of the connection piece in mirror symmetry.

3. The apparatus as set forth in claim 2, wherein the auxiliary fixing member is assembled between the protrusion pieces and fixed by a fixing pin.

4. The apparatus as set forth in claim 1, wherein the displacement measuring unit further includes a mounting piece configured to mount the displacement measuring unit to the measuring unit.

5. An apparatus for measuring dimensions of a spacer grid for a nuclear fuel assembly, the apparatus comprising:
    a fixing unit fixed to a measuring table;
    a measuring unit mounted on the fixing unit and including
        at least one movable member coupled to the fixing unit and being able to move in a first horizontal direction on the fixing unit, and
        at least one measuring member configured to measure dimensions of the spacer grid, coupled to a corresponding one of the at least one movable member and being able to move in a second horizontal direction on the movable member; and
    a displacement measuring unit coupled to one side of the measuring unit;
    wherein the movable member of the measuring unit comprises:
        short shaft piece coupled to the base member by at least one first rail and configured to move along the first rail in the first horizontal direction;
        a long shaft piece extending perpendicular to the short shaft piece;
        a transfer pipe arranged in parallel to the long shaft; and
        a second rail arranged in parallel to the long shaft, and
    wherein the measuring member of the measuring unit is coupled to the transfer pipe and the second rail, and configured to move along the second rail.

6. The apparatus as set forth in claim 5, wherein the measuring member includes:
    a connection piece coupled to the second rail and configured to move in the second horizontal direction;
    a transfer piece coupled to the transfer pipe, partially inserted into a guide channel of the long shaft piece, and configured to move in the second horizontal direction;
    a grip piece configured to grasp one side of the spacer grid; and
    a contact piece installed on the connection piece and configured to contact with the spacer grid.

7. The apparatus as set forth in claim 6, wherein the grip piece is formed of synthetic resin.

8. The apparatus as set forth in claim 6, wherein the measuring member is configured to be moved by cylinders in the second horizontal direction on the long shaft piece, the cylinders supplying air or oil pressure to nozzles on the transfer pipe.

9. The apparatus as set forth in claim 5, wherein the transfer pipe includes air nozzles on each ends of the transfer pipe.

10. An apparatus for measuring dimensions of a spacer grid for nuclear fuel assembly, the apparatus comprising:

a fixing unit fixed to a measuring table;

a measuring unit mounted on the fixing unit and including movable members and measuring members, the movable members and the measuring members configured to measure dimensions of the spacer grid while moving in the scope of whole length of the side of the spacer grid; and a displacement measuring unit coupled to one side of the measuring unit, wherein the fixing unit includes:

a main fixing member having an upper plate and a lower plate at both ends;

a base member fixed to the main fixing member, the base member comprising:

middle protrusion pieces formed in the middle of the base member and configured to be fastened to the main fixing member;

finish pieces formed at both ends of the base member; and first rails configured to be inserted into the middle protrusion pieces and the finish pieces; and an auxiliary fixing member comprising:

a connection piece configured to be interposed between the protrusion pieces; and support pieces formed at both sides of the connection piece in mirror symmetry, wherein each of the movable members of the measuring unit comprises:

short shaft pieces coupled to the base member by the first rails and configured to move along the first rails in left and right directions;

a long shaft piece extending perpendicular to the short shaft piece;

a transfer pipe arranged in parallel to the long shaft; and a second rail arranged in parallel to the long shaft, wherein each of the measuring members of the measuring unit is coupled to the transfer pipe and the second rail, and configured to move along the second rail, wherein the auxiliary fixing member is assembled between the protrusion pieces and fixed by a fixing pin, wherein each measuring member includes:

a connection piece coupled to the second rail and configured to move in the forward and backward directions;

a transfer piece coupled to the transfer pipe, partially inserted into a guide channel of the long shaft piece, and configured to move in the forward and backward directions;

a grip piece configured to grasp one side of the spacer grid; and a contact piece installed on the connection piece and configured to contact with the spacer grid, wherein the displacement measuring unit further includes a mounting piece configured to mount the displacement measuring unit to the measuring unit, wherein the transfer pipe includes air nozzles on each ends of the transfer pipe, wherein the measuring unit is configured to measure all the sides of the spacer grid while the movable members move along the first rails in the left and right directions and the measuring members move along the second rail in the forward and backward directions, wherein the grip piece is formed of synthetic resin, and wherein the measuring member is configured to be moved by cylinders in backward and toward directions on the long shaft piece, the cylinders supplying air or oil pressure to the nozzles on the transfer pipe.

\* \* \* \* \*